3,733,214
PRESSURE SEALABLE PACKAGING FILM
Frank H. Stockhausen, Wauwatosa, Wis., assignor to
Milprint, Inc., Milwaukee, Wis.
Filed July 19, 1971, Ser. No. 163,817
Int. Cl. B32b 23/08, 27/08
U.S. Cl. 117—76 F                     2 Claims

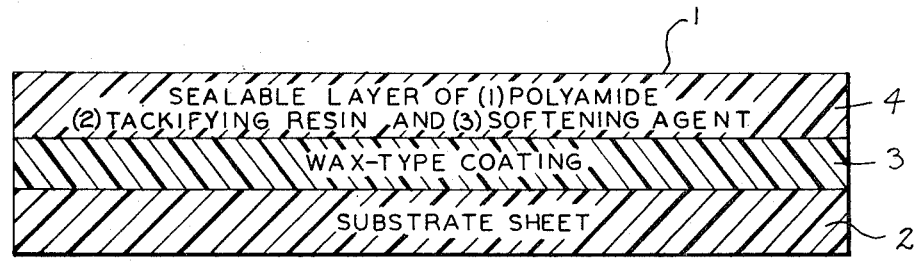
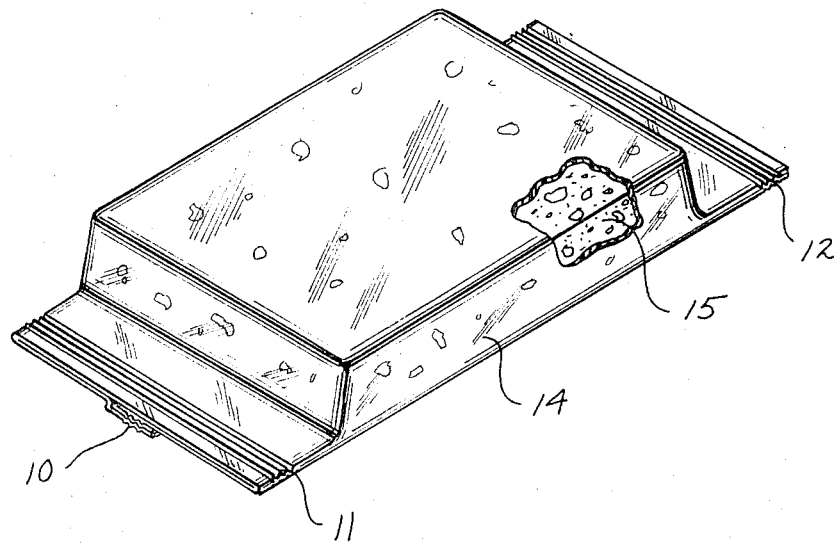

ABSTRACT OF THE DISCLOSURE

A packaging film formed of (1) a substrate sheet of flexible packaging material, (2) a tacky wax-type coating on a surface of the substrate sheet, and (3) a sealable layer covering the wax-type coating which comprises a mixture of a polyamide, a tackifying resin and a softener. The sealable layer of the foregoing composition is capable of forming seals for the production of packages from the film by the use of pressure alone at room temperature conditions.

BACKGROUND OF THE INVENTION

(1) Field

This invention relates to flexible packaging film of the type having a wax-type coating which is tacky and shows a tendency to block, wherein the wax-type coating is protected with an overcoating that is capable of forming seals by the application of pressure alone, in addition to being sealable by the application of heat and pressure as in heat sealing.

(2) Description of the prior art

U.S. Pat. 3,574,669 discloses a wax coated flexible packaging film with the wax coating covered by a polyamide overcoating. The polyamide overcoating in this patent is very thin, with a coating weight of about .2 to 1.0 pound per ream; the film utilizes the wax coating as the sealable layer, with the polyamide overcoating being thin enough so as not to deleteriously interfere with the sealability of the wax coating. Thus the thin polyamide layer disclosed in this patent is intended as a non-blocking overcoating which will not impair the sealing characteristics (which may be heat sealing or pressure sealing) of the wax coating.

Problems arise, however, in the attempt to accurately apply a very thin overcoating in such manner as not to interfere with the sealability of the layer which it protects. Further, if the polyamide coating is at a weight of over one pound per ream, good pressure seals cannot be formed in a reliable manner.

SUMMARY OF THE PRESENT INVENTION

My present invention provides a packaging film formed of a flexible substrate carrying a wax-type coating on one surface and a sealable layer over the wax-type coating which is formed of an admixture of three ingredients: (1) a polyamide of specified composition, (2) a tackifying resin, and (3) a softener. Unlike the prior art film described above, the sealable layer of this composition provides the sealing surface of the film and not the wax coating over which it is applied. The sealable layer of this composition is to be applied at a coating weight of at least 1.3 pounds per ream (3,000 square feet) of the substrate film. The sealable layer of this composition provides the property of forming seals under the application of pressure alone, so that heat seals are not necessary in order to form packages from the film of this invention.

Among the principal objects of this invention are: to provide a new pressure sealable flexible packaging film; to provide a wax coated flexible packaging film wherein the wax coating is covered with a layer that has the dual functions of preventing blocking of the wax coating and imparting pressure sealability characteristics to the film; to provide a flexible packaging film suitable for the production of vacuum packages on the commercial packaging machines; to provide a packaging film that may be sealed on commercial packaging machines through the employment of pressure alone or through the use of heat sealing techniques. A more specific object is to provide the particular details of composition set forth in the claims.

DESCRIPTION OF THE DRAWINGS

The present invention is described with reference to the accompanying drawings which illustrate a presently-preferred embodiment of the invention. It is to be understood that the illustrated embodiment, as well as the variations described hereinafter, are intended to illustrate but not limit the present invention inasmuch as it is anticipated that those skilled in the art will be able to devise changes to the disclosed embodiments and other embodiments which will remain within the true spirit and scope of the present invention.

In the drawings:

FIG. 1 is a sectional view of a sheet of flexible packaging film made in accordance with the present invention, and FIG. 2 is a perspective view of a package made from the film as shown in FIG. 1.

DESCRIPTION OF THE PREFERRED EMBODIMENTS

FIG. 1 illustrates a sheet 1 of flexible packaging film made according to my present invention and including a substrate sheet 2, a layer of wax-type coating 3 on one surface of the substrate sheet, and a sealable layer 4 covering the wax-type coating 3.

The substrate sheet 2 is a flexible film such as normally used in packaging application, including cellulosic materials such as paper, glassine, cellophane and cellulose acetate and non-cellulosic materials such as synthetic plastic films of polyester (e.g. "Mylar") and metal foils such as aluminum foil. The substrate sheet should be of a material capable of withstanding a temperature of 250° F. without distortion in order to withstand the application of the wax coating 3. For most packaging uses, the substrate sheet will be from 1 to 3 mils thick, although sheets of other thicknesses can also be used. The substrate sheet may be a single layer of one of the foregoing materials, or a composite material of two or more layers of the same or dissimilar materials joined together by lamination or extrusion coating techniques.

The wax-type coating 3 can be coated or impregnated on one or both sides of the substrate 2, although it is generally applied on only one side as illustrated in the drawings. The term "wax-type" coating as used herein and in the claims is defined as referring in a generic sense to coatings comprising (a) entirely paraffin or microcrystalline petroleum wax, (b) a mixture of paraffin and microcrystalline petroleum waxes, or (c) a mixture of about 40–95% by weight of paraffin or microcrystalline petroleum wax (or a mixture of both) together with modifying agents such as natural and synthetic polymers added to impart specific characteristics. Polyethylene, butyl rubber, polyisobutylene and plasticizers are examples of materials generally added to wax-type coatings as modifying agents. Paraffin waxes are derived from light and medium lubricating oil distillates and are mixtures of straight chain or normal hydrocarbons usually ranging from $C_{20}$ to $C_{30}$ and sometimes higher. Microcrystalline waxes are obtained from heavy lubricating oil distillates and generally range from $C_{30}$ to $C_{60}$. In general, the microcrystalline waxes have a melting point of from about 140° F. to 195° F. and the paraffin waxes have a melting point of from about 110° F. to as high as about 185° F., although these ranges are not fixed, and comparatively, the paraffin waxes are hard and brittle whereas the microcrystalline waxes are soft, flexible and sticky. Wax-type coatings of this nature are used in the packaging field because of their low moisture vapor transmission rates and may be applied to paper or other cellulosic substrates to impart moisture vapor impermeability to the coated material, usually at a thickness of about 3 to 5 mils. The coatings are usually heat sealable, exhibit good gloss and transparency and are of relatively low cost. Wax-type coatings can be used in direct contact with food products without affecting their taste and odor. Wax-type coatings of this general nature are melted, and then applied to the substrate in a molten condition by kiss coating, knife coating, squeeze roll coating, dip coating, gravure coating and other conventional coating methods.

The sealable layer 4 of the sheet 1 is to comprise an admixture of three ingredients: (1) a polyamide film-former, (2) a tackifying resin of a glycerol ester of hydrogenated rosin and (3) a softening agent comprising a hydrogenated methyl ester of rosin. The polyamide film-former is a polyamide formed by the reaction of a dimerized and trimerized fatty acid with ethylene diamine, such as polyamide resins formed from the reaction of dimerized linoleic acid with ethylene diamine. Compounds of this type are available commercially under the trade name Versamid, sold by General Mills, Inc., and are described in U.S. Pat. 2,379,413. The polyamide film-former should be of a type which is soluble in alcohols such as n-propanol, isopropanol, butanol, and mixtures of alcohols with aliphatic or aromatic hydrocarbons. They have a viscosity of 15 to 45 poises at 105° C. measured by a Brookfield viscometer. The polyamide identified as Versamid 940, having a softening point of 105° to 115° C. (ASTM E28–51T) and Versamid 930 which has a softening point of 105° to 115° C. are useful materials. The tackifying resin is added to the polyamide of the foregoing composition in order to form a pressure sensitive type of coating. Glycerol esters of hydrogenated rosin are useful. These are available commercially under the trade name "Staybellite Ester 5" (softening point 178° F., acid number 5) and "Staybellite Ester 10" (with a softening point of 183° F. and an acid number 8). Staybellite Ester number 5 is preferred because it is purified by steam distillation and has reduced odor problems, thereby making it suitable for packaging a wider variety of materials, particularly foods. The softening agent further aids in obtaining a pressure seal and acts as a plasticizer; it is to be a resinous material that is liquid at room temperature, comprising a hydrogenated methyl ester of rosin. A suitable softening agent is that available commercially under the trademark Hercolyn D. Because of its high molecular weight and resinous nature, this class of tackifier does not soften the polyamide the way most plasticizers would. Thus, this ingredient provides a combination of characteristics which leads to a workable film in admixture with the other two ingredients of this sealable layer. The tackifying resin is to be resinous, or solid, at room temperature.

On a composition basis, the sealable layer 4 is to comprise 83–95% of the specified polyamide, 2.5 to 6% of the tackifyer and 2.5 to 6% of the softener; as an optional ingredient, 0 to 5% of slip or anti-block agents may be included in the coating. All percentages are expressed on a weight basis.

This invention will be further understood by reference to the following example wherein the percentages are on a weight basis unless otherwise noted.

Example 1

A substrate sheet of 210 MST–44 cellophane (a nitrocellulose coated moisture proof cellophane) approximately 1 mil thick was coated with a wax-type coating comprising 77% microcrystalline wax, 20% butyl rubber and 3% polyethylene thickener. The wax coating was applied at a weight of 50 pounds per ream (3,000 square feet) and had a thickness of about 5 mils. Over the wax-type coating, a sealable layer comprising the following composition was applied at a coating weight of 1.6 pounds per ream:

|  | Percent |
| --- | --- |
| Polyamide film-former (Versamid 940) | 87 |
| Tackifying resin (Staybellite Ester 5) | 5.2 |
| Softening agent (Hercolyn D) | 5.2 |
| Slip agent | 2.6 |

The foregoing composition was applied as a solvent solution of 38.6% solid in 61.4% solvent consisting of isopropyl alcohol and petroleum hydrocarbon. The resulting film could be rolled into roll-form without blocking between contacting layers, except that in some instances a light starch dusting can be helpful to prevent blocking along the edges of the roll. The film was sealed on a Sentinel sealer between a flat metal jaw and a metal rod (two sizes of rods were used, a $3/16''$ diameter rod and a $5/16''$ diameter rod) to provide fused pressure sealed ribs using a force of five pounds per lineal inch of seal length and holding the surfaces in contact for a dwell time of approximately ¼ second; the seals were formed between contacting portions of the sealable layer 4. Other jaw pressures and dwell times may be used and should be selected to form the desired type of seal in accordance with usual packaging techniques. The seals thusly made are of a peelable nature and they can be peeled apart without rupture or other damage to the substrate film. Sealing jaws which have a surface configuration that concentrates the sealing force, such as jaws with vertical ribs, horizontal ribs, corrugations, etc., are preferred for sealing the films of this invention because less sealing pressure will be required than with a sealing jaw having a flat sealing surface.

Sheets of the foregoing film material were used to make cheese packages as illustrated in FIG. 2 wherein a sheet of the material was folded into tubular-form with the sealable layer 4 positioned along the interior of the package. The overlapping longitudinal edges of the sealable layer 4 were pressure sealed to one another to form a fin-seam 10 along the back of the package. Pressure seams 11 and 12 were formed across the ends of the package to complete the enclosure to form a package 14 enclosing a block 15 of cheese. The film was sealed between two metallic jaws which provided a plurality of longitudinal ribs in the seam areas, as depicted in the drawings. The packages were made on a Hudson Sharp machine utilizing pressure only to join the contacting portions of the sealable layer 4 to form the seams 10, 11 and 12. It was found that satisfactory packages having seams of excellent strength resulted when utilizing the film of this example.

There has thus been described a new packaging film employing a flexible substrate, a wax-type coating on the surface of the substrate, and a pressure sealable layer overlying the wax coating and formed of a polyamide resin, a softening agent and a tackifying resin, each of the latter ingredients being of specified compounds as hereinabove described. The film is capable of forming packages by contacting portions of the sealable layer being joined together upon the application of pressure alone. The wax coating underneath the sealable layer does not form the seal, instead the sealable layer had dual functionality in that it forms the seal and also provides a non-blocking overcoating for the wax coating. Thus the sealable layer of the disclosed composition provides a delicate balance between pressure sealing characteristics and non-blocking properties, the two properties being diametrically opposed to one another, in that the hardness necessary for non-blocking is generally not soft enough to give a pressure sealable film. These two divergent features, however, are provided in the film of this invention.

I claim:

1. A packaging film comprising, in combination:
   (1) a substrate sheet of flexible packaging film,
   (2) a wax-type coating on a surface of the substrate sheet, and
   (3) a sealable layer covering the wax-type coating,
      (a) the sealable layer comprising an admixture of on a weight basis, (i) 83 to 95% of a polyamide film-former formed by the reaction of a dimerized and trimerized fatty acid with ethylene diamine, (ii) 2.5 to 6% of a tackifying resin comprising a resinous glycerol ester of hydrogenated rosin, (iii) 2.5 to 6% of a softening resin comprising a liquid hydrogenated methyl ester of rosin, and (iiii) 0 to 5% of a slip agent,
      (b) the sealable layer being applied at a weight of at least 1.3 pounds per ream,
      (c) the sealable layer being sealable to itself upon the application of pressure.

2. A packaging film according to claim 1, wherein: the sealable layer comprises 87% of the polyamide, 5.2% of the tackifying resin, 5.2% of the softening agent and 2.6% wax slip agent.

References Cited

UNITED STATES PATENTS

| 3,574,669 | 4/1971 | Chase | 117—76 F |
| 3,598,634 | 8/1971 | Kraft | 117—76 F |
| 2,833,671 | 5/1958 | Funk et al. | 117—92 X |
| 3,347,950 | 10/1967 | Mazurk | 117—122 PA X |
| 3,462,284 | 8/1969 | Vertnik | 117—122 PA X |
| 3,455,726 | 7/1969 | Mitchell et al. | 117—90 X |

RALPH HUSACK, Primary Examiner

U.S. Cl. X.R.

99—171 LP, 178; 117—68, 75, 76 P, 90, 91, 92, 122 P